US010972039B2

(12) United States Patent
Mayer-John et al.

(10) Patent No.: US 10,972,039 B2
(45) Date of Patent: Apr. 6, 2021

(54) DEVICE AND METHOD FOR CONTROLLING AN ELECTRIC MACHINE

(71) Applicant: Robert Bosch GmbH, Stuttgart (DE)

(72) Inventors: Eckart Mayer-John, Stuttgart (DE); Florian Malchow, Stuttgart (DE); Stefan Schaut, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 16/071,191

(22) PCT Filed: Dec. 20, 2016

(86) PCT No.: PCT/EP2016/081840
§ 371 (c)(1),
(2) Date: Jul. 19, 2018

(87) PCT Pub. No.: WO2017/125231
PCT Pub. Date: Jul. 27, 2017

(65) Prior Publication Data

US 2020/0287498 A1 Sep. 10, 2020

(30) Foreign Application Priority Data

Jan. 20, 2016 (DE) ..................... 10 2016 200 665.7

(51) Int. Cl.
*H02P 29/028* (2016.01)
*H02P 21/20* (2016.01)
(Continued)

(52) U.S. Cl.
CPC .......... *H02P 29/028* (2013.01); *B60L 15/025* (2013.01); *B60L 15/20* (2013.01);
(Continued)

(58) Field of Classification Search
None
See application file for complete search history.

(56) References Cited

U.S. PATENT DOCUMENTS 5,610,490 A * 3/1997 King ..................... B60L 15/025 318/611
6,299,261 B1 * 10/2001 Weiberle ................. B60T 8/885 303/122.04
(Continued)

FOREIGN PATENT DOCUMENTS

CN 102868348 A 1/2013
DE 102010061897 A1 5/2012
DE 102012218612 A1 4/2014

OTHER PUBLICATIONS

International Search Report with English translation and Written Opinion for Application No. PCT/EP2016/081840 dated Mar. 16, 2017 (10 pages).

*Primary Examiner* — Bentsu Ro
(74) *Attorney, Agent, or Firm* — Michael Best & Friedrich LLP

(57) ABSTRACT

The invention provides a device (10) and a method for controlling an electric machine (1). The method comprises the steps of: providing (S01) a desired torque value (54) for a torque to be exerted by the electric machine (1); determining (S02) a fault signal (51) which indicates a fault state of the electric machine (1); determining (S03) a current rotor angle value (56) of the electric machine (1); determining (S04) a fault state operating point (62; 62') on the basis of the desired torque value (54) provided, the determined fault signal (51) and the determined current rotor angle value (56); and shifting or moving (S05) an operating point, at which the electric machine (1) is operated, from a normal state operating point (61) to the determined fault state operating point (62; 62').

10 Claims, 7 Drawing Sheets

Figure 1:
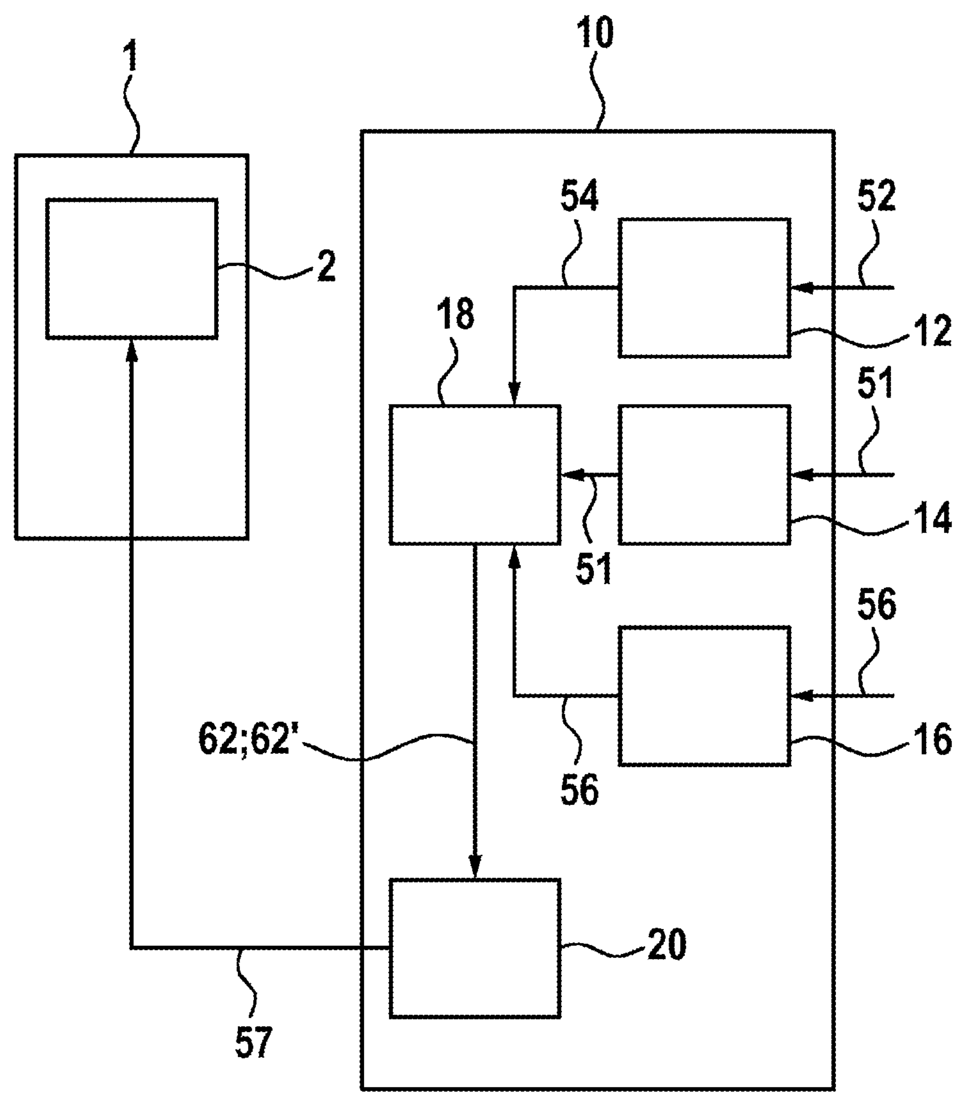

(51) Int. Cl.

| | |
|---|---|
| ***H02P 29/032*** | (2016.01) |
| ***B60L 15/02*** | (2006.01) |
| ***B60L 15/20*** | (2006.01) |
| ***H02P 21/12*** | (2016.01) |

(52) U.S. Cl.

CPC .............. *H02P 21/12* (2013.01); *H02P 21/20* (2016.02); *H02P 29/032* (2016.02)

(56) References Cited

U.S. PATENT DOCUMENTS

| | | | | |
|---|---|---|---|---|
| 6,449,567 | B1 * | 9/2002 | Desai .................. | G01R 31/343 318/490 |
| 2004/0090195 | A1 * | 5/2004 | Motsenbocker ........ | B60L 58/33 318/109 |
| 2004/0091622 | A1 * | 5/2004 | Fernandes ............... | B32B 27/04 427/355 |
| 2005/0067986 | A1 * | 3/2005 | Kurosawa ............. | G11B 19/28 318/400.35 |
| 2007/0013338 | A1 * | 1/2007 | Swamy ..................... | H02P 3/18 318/798 |
| 2007/0229009 | A1 | 10/2007 | Egami et al. | |
| 2015/0123581 | A1 | 5/2015 | Omata et al. | |

* cited by examiner

DEVICE AND METHOD FOR CONTROLLING AN ELECTRIC MACHINE

BACKGROUND OF THE INVENTION

The present invention relates to a device for controlling an electric machine and a method for controlling an electric machine. The electric machine can in particular be an electric machine operated as a motor.

Faults in power electronics of electric machines, e.g. of drives, fed by converters can have the result that a normal operation of the electric machine is no longer possible or only possible to a limited extent. One possible difficulty is that electric voltage vectors can only be implemented to a limited extent by the power electronics of the electric machine. The cause for this can, for example, be a failure of a semiconductor or of control electronics.

A method and a device for field-oriented regulation of an electric machine is described in DE 10 2008 042 931 A1.

SUMMARY OF THE INVENTION

A device for the control of an electric machine is accordingly provided with: a provision apparatus that is designed to provide a desired torque value for a torque to be exerted by the electric machine, i.e. to specify what value the torque to be exerted by the electric machine should have; a monitoring apparatus that is designed to determine a fault signal that indicates a fault state of the electric machine, in particular of power electronics of the electric machine; a determination apparatus that is designed to determine a current rotor angle value of the electric machine; a computing apparatus that is designed to determine at least one fault state operating point on the basis of the provided desired torque value, the determined fault signal and the determined current rotor angle value, preferably a fault state operating point trajectory; and a control apparatus that is designed to shift an operating point at which the electric machine is operated from a normal state operating point to the determined fault state operating point, in particular along the fault state operating point trajectory. The fault state operating point can advantageously have the desired torque value.

Electric machine refers here in particular to an electric machine with a rotor that rotates relative to a stator of the electric machine, whereby either electric current is generated (generator operation) or a torque is generated (motor operation). The desired torque value can, for example, be based on a user input (e.g. a pressing down of a pedal by a driver of a vehicle with the electric machine as drive). A fault state operating point trajectory refers to a trajectory along which the operating point of the electric machine in the fault state should be traveled little by little through appropriate control. The fault state operating point trajectory can comprise all determined fault state operating points as well as the normal state operating point.

A method is further provided, having the steps of: providing a desired torque value for a torque to be exerted by an electric machine; determining a fault signal that indicates a fault state of the electric machine, in particular of power electronics of the electric machine; determining a current rotor angle value of the electric machine; determining at least one fault state operating point on the basis of the desired torque value provided, the determined fault signal and the determined current rotor angle value, preferably a fault state operating point trajectory; and shifting or moving an operating point at which the electric machine is operated from a normal state operating point to the determined fault state operating point, preferably along the fault state operating point trajectory.

The present invention enables a dynamic extension of the operating range of an electric machine. The influence of a fault, in particular in the power electronics, can have its effect on the torque of the machine compensated for, i.e. reduced or even eliminated. The device according to the invention requires no structural changes, or only very small ones, to synchronous machines that already exist, and is therefore highly versatile in application.

The device according to the invention, or the method according to the invention, are particularly suitable for synchronous machines, in particular for anisotropic synchronous machines with a reluctance component. This includes, amongst others, permanently excited synchronous machines (PSM), electrically excited synchronous machines (ESM), synchronous reluctance machines (SynRM) and transversal and axial flux machines (TFM and AFM). The variants and modifications described can, furthermore, also be applied to or adapted for asynchronous machines.

The device according to the invention can, in particular, be part of a traction drive for an electric or a hybrid vehicle, an electric actuating drive and/or an industrial drive.

Advantageous forms of embodiment and developments emerge from the subsidiary claims as well as from the description with reference to the figures.

According to a preferred development, the normal state operating point is arranged on a first branch of a current ratio function that is separated from a second branch of the current ratio function, for example by a vertical asymptote. The current ratio function represents a ratio of an electric current, iq, in the q-direction of the electric machine to an electric current, id, in the d-direction of the electric machine. The q-direction and the d-direction represent coordinate directions that are arranged with a fixed relationship to a rotor of the electric machine or to a magnetic rotor flux linkage of the electric machine. The terms d-direction and q-direction are customary terms in the context of the so-called d/q transformation, also referred to as the dq transformation, dq0 transformation or as the Park transformation, whose purpose is to transfer three-phase magnitudes, such as in the case of a three-phase machine with the axes a, b, c, into a two-axis coordinate system with the axes d and q.

All points of each individual branch of the current ratio function have the same torque value. The first branch of the current ratio function preferably exhibits the desired torque value. The second branch of the current ratio function can exhibit the same torque value as the first branch, for example the desired torque value again. The current ratio function can be directly defined in that all its points exhibit the same torque value. The second branch of the current ratio function can, however, also exhibit a different torque value, preferably a larger torque value than the desired torque value.

When it is said that a point of the current ratio function comprises a torque value, it ought to be understood that when the electric machine is driven with an electric current iq in the q-direction and an electric current id in the d-direction of the electric machine in accordance with the current ratio function, the electric machine provides a torque with the corresponding torque value.

The preferably generated fault state operating point trajectory that is traveled along by the operating point in the fault state is advantageously arranged partially on the first branch and partially on the second branch of the current ratio function. The determined fault state operating point advantageously has a negative iq value. The preferably generated fault state operating point trajectory that is traveled along by the operating point advantageously comprises both positive and negative iq values. It can be ensured in this way that an operating point on the fault state operating point trajectory is approachable for every current rotor angle value.

According to a further preferred development, the computing apparatus is designed to determine the fault state operating point depending on the determined fault signal and the determined rotor angle value on the first branch of the current ratio function. In other words, the operating point of the electric machine can be shifted along the first branch of the current ratio function depending on the said magnitudes, whereby the torque provided by the electric machine remains constant. In this way it is, for example, possible to avoid the possibility that due to a fault in the fault state, as a result of which the normal state operating point is not approachable, the desired torque cannot be provided.

According to a further preferred development, the computing apparatus is designed to determine the fault state operating point depending on the determined fault signal and the determined current rotor angle value on the second branch of the current ratio function. In this way a desired torque can even be provided by the electric machine when the entire first branch is not approachable due to the fault state. One and the same device according to the invention can be designed to determine the fault state operating point, depending on the respective determined fault signal, on the first or on the second branch of the current ratio function.

According to a further preferred development, the control apparatus is designed to adjust a transformation of first coordinate values in the d-direction and the q-direction into second coordinate values in a/b/c coordinates that indicate terminal magnitudes, depending on the determined fault signal. Terminal voltages are often quoted in the so-called a/b/c coordinates. A distortion of the provided terminal voltages as a result of the fault state of the electric machine can thus be avoided.

According to a further preferred development, the computing apparatus is designed to determine the fault state operating point such that it exhibits a fault state torque value that differs from the desired torque value. The fault state torque value is preferably greater than the desired torque value, or is greater than or equal to the desired torque value. In this way any potential reductions caused by the fault state in the time-averaged torque provided by the electric machine, i.e. in the actual torque generated by the electric machine on average, can be reduced or compensated for.

According to a further preferred development, the device according to the invention comprises the electric machine to be controlled.

According to a preferred development of the method according to the invention, the fault state operating point is determined on the first branch of the current ratio function and/or on the second branch of the current ratio function, depending on the determined fault signal and the determined current rotor angle value, wherein the previous definitions of the current ratio function and of the first and the second branches of the current ratio function apply.

According to a further preferred development, the fault state operating point is determined such that it exhibits a fault state torque value that differs from the desired torque value, in particular is greater than the desired torque value or greater than or equal to the desired torque value.

SHORT DESCRIPTION OF THE DRAWINGS

Figure 3A:
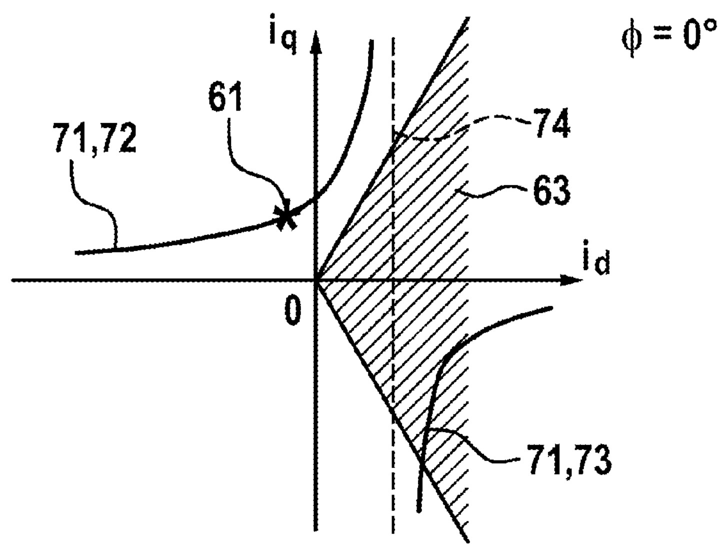
Figure 3B:
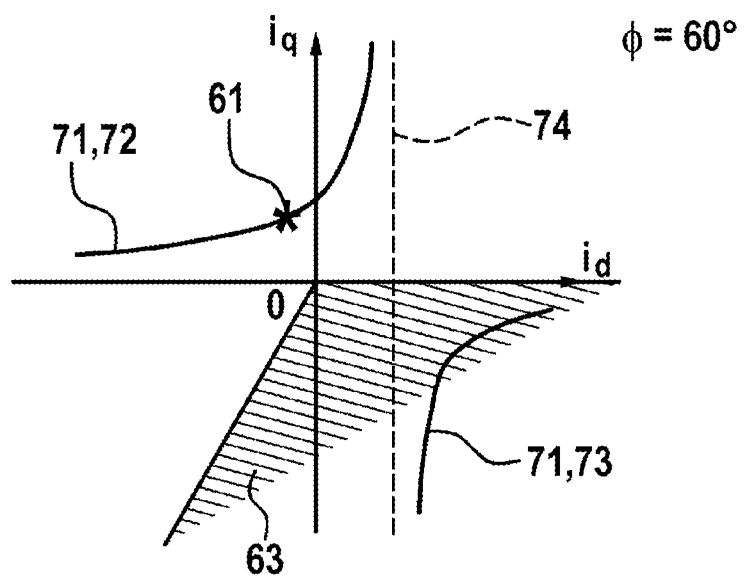
Figure 3C:
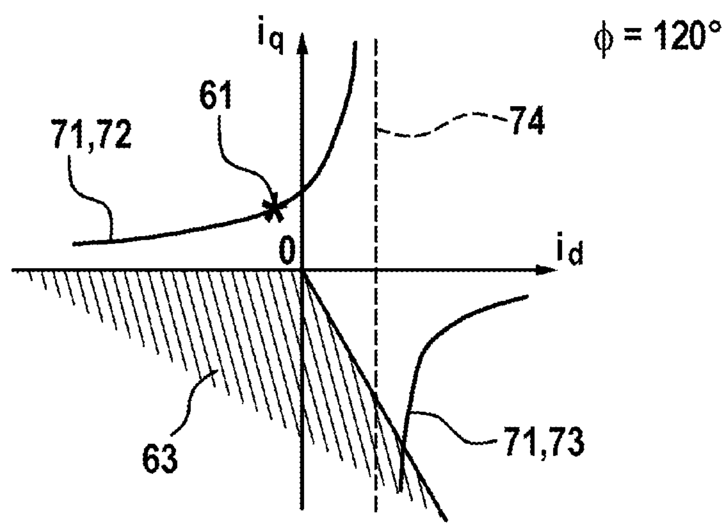
Figure 3D:
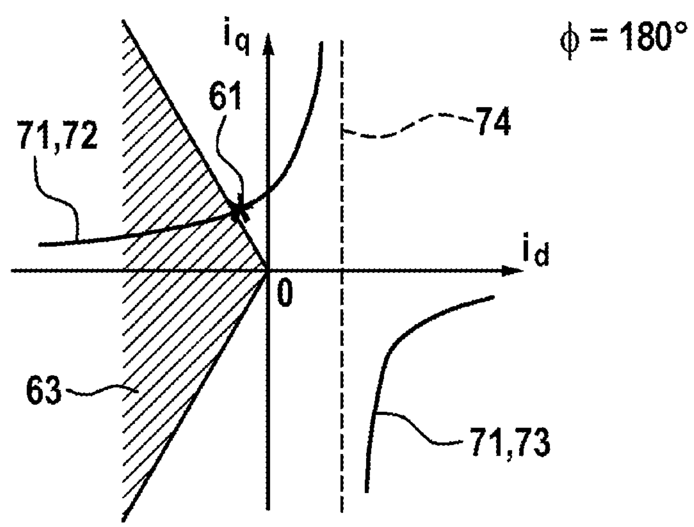
Figure 3E:
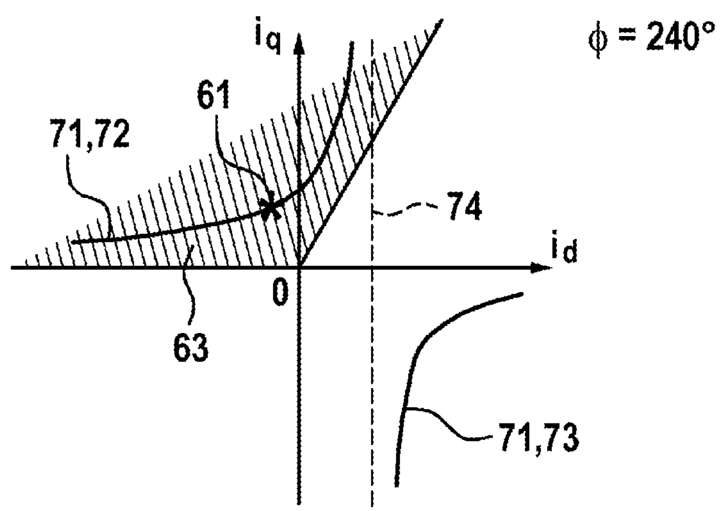
Figure 3F:
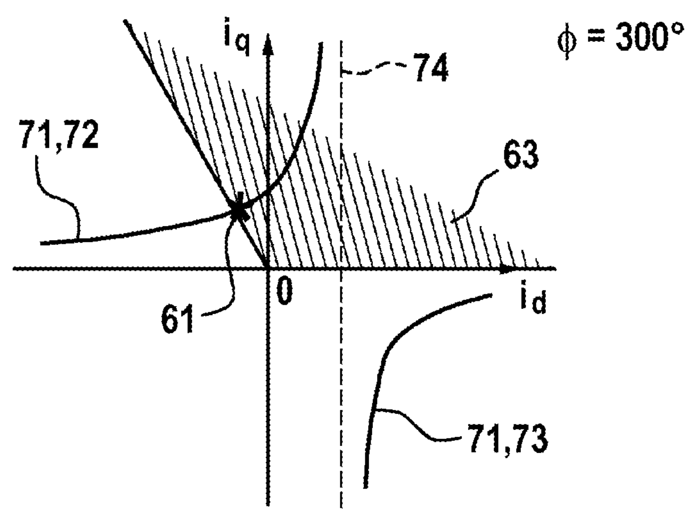
Figure 4A:
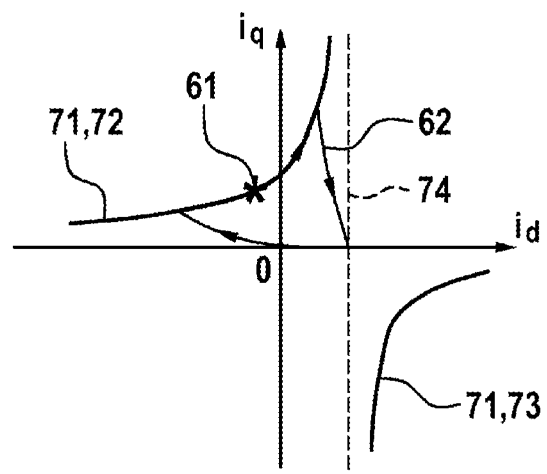
Figure 4B:
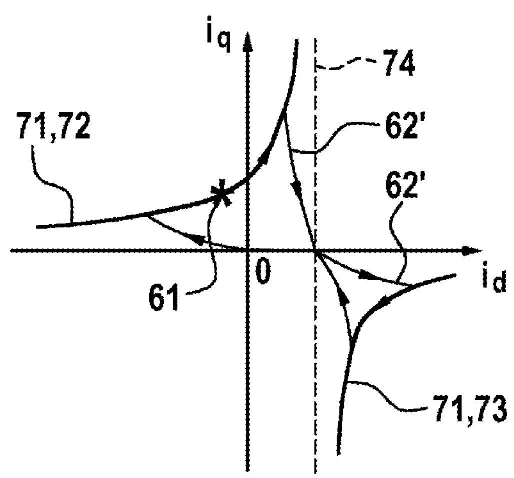
Figure 5:
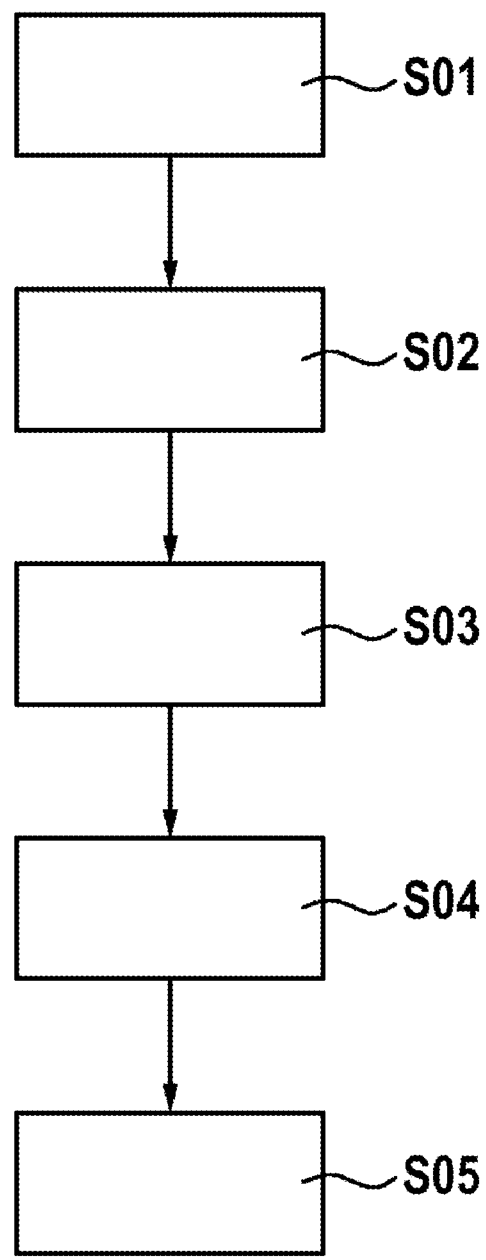

The present invention will be explained below in more detail on the basis of the exemplary embodiments illustrated in the schematic figures of the drawings. In the figures:

FIG. 1 shows a schematic block diagram of a device for controlling an electric machine according to one form of embodiment of the present invention;

FIG. 2, FIG. 3*a* to FIG. 3*f*, FIG. 4*a* and FIG. 4*b* show schematic graphs for the explanation of the mode of operation of the device of FIG. 1; and FIG. 5 shows a schematic flow diagram for the explanation of a method for controlling an electric machine according to a further form of embodiment of the present invention.

Elements and devices that are identical or have the same function are—unless otherwise stated—given the same reference signs in all figures. The numbering of method steps serves the purposes of clarity, and should in particular not imply a specific temporal sequence unless otherwise stated. In particular, a plurality of method steps may also be carried out simultaneously.

DETAILED DESCRIPTION

FIG. 1 shows a schematic block diagram of a device 10 for controlling an electric machine 1 according to one form of embodiment of the present invention. Reference is also made to the following FIGS. 2, 3*a* to 3*f*, 4*a* and 4*b* in the description of the device 10. Even though by way of example the case in which the electric machine 1 is arranged in a vehicle and can function as its generator and/or motor is frequently described, it is nevertheless to be understood that the electric machine 1 can also be used outside a vehicle. The device 10 is preferably designed for controlling a synchronous machine with a reluctance component as an electric machine 1, but can also be used for any other desired electric machines 1.

The device 10 comprises a provision apparatus 12 that is designed to provide a desired torque value 54 for a torque to be exerted by the electric machine 1. The provision apparatus 12 can, for example, be an interface through which an externally predefined desired torque value 52 can be received and can be provided as the desired torque value 54 for the electric machine 1. The externally predefined desired torque value 52 can, for example, be provided by a vehicle control of a vehicle for which the machine 1 functions as its drive and/or generator. The externally predefined desired torque value 52 can, for example, be based on an input of the driver, such as through pressing a pedal or moving a lever. The provision apparatus 12 can, however, also be designed to calculate the desired torque value 54 on the basis of signals that are internal, in particular internal to the vehicle, and/or further signals that are external, in particular external to the vehicle, and to provide the result of the calculation.

The device 10 further comprises a monitoring apparatus 14 that is designed to determine a fault signal 51. The fault signal 51 can be captured directly by the monitoring apparatus 14. Alternatively or in addition, the fault signal 51 can also be observed or estimated by the monitoring apparatus 14 on the basis of other measured values, i.e. determined indirectly through, for example, a diagnostic method.

The fault signal 51 indicates a fault state of the electric machine 1, in particular a fault state of power electronics 2 of the electric machine 1. The fault signal 51 can, for example, comprise information regarding which switch of the power electronics 2 is unusable, for example having broken down. The fault signal 51 can, alternatively or in addition, also contain information regarding which parameter values of control parameters of the electric machine 1 are not approachable due to the fault state that is indicated by the fault signal 51. In particular, the fault signal 51 can comprise information regarding whether the normal state operating point 61 in the iq-id plane of the electric machine 1 is approachable, bearing in mind the fault state of the electric machine 1. The fault signal 51 can, for example, be provided by the electric machine 1, by its power electronics 2 and/or by a vehicle controller of the vehicle in which the electric machine 1 is arranged.

The device 10 also comprises a determination apparatus 16 that is designed to determine a current rotor angle value 56 of a rotor angle of a rotor of the electric machine 1. The rotor angle value 56 can be measured explicitly by the determination apparatus 16. Alternatively or in addition, the rotor angle value 56 can also be determined indirectly on the basis of other measured variables making use of appropriate methods. In particular in the case of a control of the electric machine 1 that is described by d and q coordinates, the question of which operating points are approachable and which are not depends on the current rotor angle value.

Figure 2:
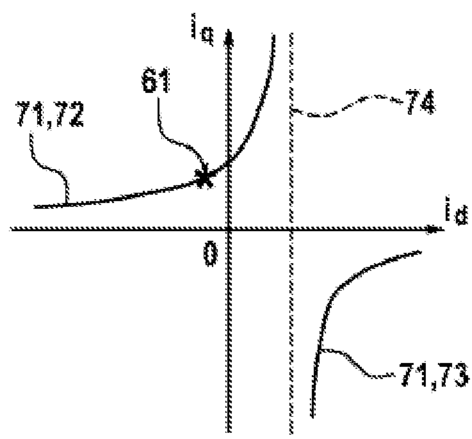

FIG. 2 shows a schematic graph for explanation of the mode of operation of the device 10. The graph in FIG. 2 has a current value iq for a current in the q-direction as ordinate, and a current value id in the d-direction as the abscissa axis. A current ratio function 71 is drawn in the graphs, comprising a first branch 72 and a second branch 73 that are separated by a vertical asymptote 74, which means that they are disjunct. Both the first branch 72 and the second branch 73 have the same, constant torque, i.e. the same torque values. A normal state operating point 61 is arranged on the first branch 72. The first branch 72 has exclusively positive iq values, while the second branch 73 has exclusively negative iq values. When the device 10 is operating, as is explained in more detail below, the normal state operating point 61 is preferably approached, since this usually leads to particularly low losses in the electric machine 1.

The device 10 is designed with a computing apparatus 18 that is designed to determine at least one fault state operating point 62; 62' on the basis of the provided desired torque value 54, the determined fault signal 51 and the determined current rotor angle value 56, preferably a fault state operating point trajectory 62, 62' in the id-iq space. The fault state operating point 62 can, for example, also have the desired torque value 54, meaning that the electric machine 1 operated at the fault state operating point 62; 62' preferably also provides a torque with the desired torque 54. The fault signal 51 can be conveyed by the determination apparatus 14 directly to the computing apparatus 18, or a signal based on the fault signal 51 can be conveyed to the computing apparatus 18.

The device 10 comprises a control apparatus 20 that is designed to set the operating point at which the electric machine 1 is operated by means of a control signal 57. The control apparatus 20 is further designed to shift the operating point of the electric machine 1 by means of the control signal 57 from the normal state operating point 61 to the determined fault state operating point 62; 62' or, preferably, to shift it along the determined fault state operating point trajectory 62; 62'.

Possible variants and examples for the mode of operation of the device 10 are explained below.

FIGS. 3*a* to 3*f* show the graphs of FIG. 2 for the case in which the electric machine 1 is in the fault state. By way of example, the fault state expresses itself in that at any point in time, respectively one region 63 of the iq-id plane is not approachable for the electric machine 1, which means that the operating point at which the electric machine 1 is operated cannot be placed or shifted in the corresponding region 63. Since the d and q coordinates are fixed with respect to the rotor, the respective region that is not approachable changes with the current rotor position, i.e. the current rotor angle value 56. In each of FIGS. 3*a* to 3*f* the region 63 that is not accessible for the operating point of the electrical machine 1 is shown. FIG. 3*a* shows the state with the rotor angle value 56 (with the symbol φ, pronounced "phi") at φ=0°, FIG. 3*b* at φ=60°, FIG. 3*c* at φ=120°, FIG. 3*d* at φ=180°, FIG. 3*e* at φ=240° and FIG. 3*f* at φ=300°, while FIG. 3*a* again corresponds to φ=360°. Thus in the illustrated example, the normal state operating point 61 for rotor angle values 56 between φ=180° and φ=300° is not accessible. For rotor angle values 56 between φ=300° and φ=180°, for example φ=60°, the normal state operating point 61 is accessible, i.e. approachable.

The computing apparatus 18 of the device 10 according to the invention can advantageously be designed such that the operating point is always left at the normal state operating point 61 when this is possible. Thus, in the example according to FIGS. 3*a* to 3*f*, the computing apparatus 18 is designed to leave the operating point at the normal state operating point 61 when a rotor angle value 56 is determined between φ=300° and φ=180°.

For those rotor angle values 56 for which the normal state operating point 61 is not accessible, the operating point is shifted by the computing apparatus 18 away from the normal state operating point 61. Advantageously the operating point is left on the first branch 72 (with positive iq values) for as long and as often as possible, and is only shifted onto the second branch 73 (with negative iq values) when this is no longer possible.

Alternatively the computing apparatus 18 can however also be designed such that the operating point itself is shifted or moved at a point in time to the fault state operating point 62; 62', at which point in time the normal state operating point 61 is accessible, such as when the computing apparatus has determined a fault state operating point trajectory 62; 62' according to which this is, considered generally, advantageous.

FIGS. 4*a* and 4*b* show possible fault state operating point trajectories 62, 62' of the operating point of the electric machine 1 on the basis of the calculation by the computing apparatus 18 on the basis of the provided desired torque value 54, the determined fault signal 51 and the determined current rotor angle value 56.

A case is represented in FIG. 4*a* in which the operating point, depending on the current rotor angle value 56, is partially shifted along the first branch 72, then moved on a trajectory in the positive iq half-plane down to the id axis (e.g. as far as the asymptote 74), and from there again onto the first branch 72, so that a closed fault state operating point trajectory 62 forms, a single transit of which corresponds precisely to one rotation of the rotor angle through 360°.

FIG. 4*b* shows an alternative closed fault state operating point trajectory 62', according to which the operating point is first shifted from the id axis, i.e. the abscissa axis, to the second branch 73, shifted along the second branch 73, shifted from there back (from the negative iq half-plane) again to the id axis, and from there again shifted onto the first branch 72. A first partial trajectory in the positive iq half-plane is configured to be the same as the fault state operating point trajectory 62 in FIG. 4*a*, and can be connected with a second partial trajectory of the fault state operating point trajectory 62' in the negative iq half-plane at a point that lies on the asymptote 74.

Since only the first and the second branches 72, 73 have in the example the desired torque value 54, the computing apparatus 18 is designed to determine the trajectories between the first and second branches 72, 73 in such a way that these cross over regions between the two first and second branches 72, 73 as quickly as possible, and that an exertion of a negative torque by the electric machine 1 does not result.

A field-oriented regulation (FOR) is usually used for controlling the electric machine 1, and is usually calculated with variables that are described in the rotating coordinate system, which is to say with the field-oriented d/q coordinates. By means of an angle-dependent transformation it is possible to convert between the field-oriented d/q coordinates, α/β coordinates that are fixed with respect to the stator (a stator of the electric machine 1) and terminal magnitudes (at terminals of the electric machine 1) in a/b/c coordinates. The transformation from d/q coordinates $u_d$, $u_q$ to α/β coordinates $u_\alpha$, $u_\beta$ is expressed as:

$$\begin{bmatrix} u_\alpha \\ u_\beta \end{bmatrix} = M_{dq}^{\alpha\beta} \begin{bmatrix} u_d \\ u_q \end{bmatrix}, \text{ where } M_{dq}^{\alpha\beta} = \begin{bmatrix} \cos\phi & -\sin\phi \\ \sin\phi & \cos\phi \end{bmatrix}$$

and where the symbol φ again refers to the current rotor angle value 56.

The transformation from the terminal magnitudes in a/b/c coordinates $u_a$, $u_b$, $u_c$ into α/β coordinates $u_\alpha$, $u_\beta$ is expressed as:

$$\begin{bmatrix} u_\alpha \\ u_\beta \end{bmatrix} = M_{abc}^{\alpha\beta} \begin{bmatrix} u_a \\ u_b \\ u_c \end{bmatrix} \text{ where } M_{abc}^{\alpha\beta} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix}.$$

In the fault-free case, i.e. in the normal state (as opposed to the fault state), it is thus possible to calculate terminal voltages at the terminals of the electric machine 1 in a/b/c coordinates directly from the voltages in d/q coordinates predetermined by the field-oriented regulation. If, however, a fault is present, which means that the electric machine 1 is in the fault state, the transformation from d/q coordinates into a/b/c coordinates can be corrupted.

The control apparatus 20 can be designed to adjust the transformation from d/q coordinates into a/b/c coordinates taking the fault state into account, i.e. making use of the determined fault signal 51. In this way a corruption of the transformation as a result of the fault state can be reduced or avoided entirely. It is possible in this way to ensure that even in the fault state, those voltages that continue to be realizable can correctly be converted into terminal voltage and set.

Advantageously the effect of the fault state is taken into account and compensated for in the transformation. This is made possible in that in the conversion of the voltages from d/q coordinates into a/b/c coordinates, a degree of freedom is available that can be used to partially compensate for malfunctions caused by certain faults.

In particular, the control apparatus 20 can be designed to subtract a correction vector $U_{\alpha\beta,fault}$ from a desired voltage vector $$U_{\alpha\beta} = \begin{bmatrix} u_\alpha \\ u_\beta \end{bmatrix}$$

in α/β coordinates to generate an effective voltage vector $\tilde{U}_{\alpha\beta}$ in the α/β coordinates that are fixed with respect to the stator:

$$\tilde{U}_{\alpha\beta} = U_{\alpha\beta} - U_{\alpha\beta,fault}$$

The correction vector $U_{\alpha\beta,fault}$ is in particular found as:

$$U_{\alpha\beta,fault} = \frac{V_{sup}}{2} M_{abc}^{\alpha\beta} f_i$$

Here, $f_i$ is an error vector that is generated by the control apparatus 20 on the basis of the determined fault signal 51, and that indicates the fault state in greater detail. Without restricting the generality, the case of a broken down switch of the power electronics 2 of the electric machine 1 that is a part of a B6 bridge of the power electronics 2 is considered by way of example. The error vector $f_i$ is, for example, depending on which of the six switches of the B6 bridge has failed:

$$f_i \in \left\{ \begin{bmatrix} 1 \\ 0 \\ 0 \end{bmatrix}, \begin{bmatrix} 0 \\ 1 \\ 0 \end{bmatrix}, \begin{bmatrix} 0 \\ 0 \\ 1 \end{bmatrix}, \begin{bmatrix} -1 \\ 0 \\ 0 \end{bmatrix}, \begin{bmatrix} 0 \\ -1 \\ 0 \end{bmatrix}, \begin{bmatrix} 0 \\ 0 \\ -1 \end{bmatrix} \right\}$$

The corrected voltage according to the effective voltage vector $\tilde{U}_{\alpha\beta}$ is then converted by the control apparatus 20 into a/b/c coordinates. A modified transformation of α/β coordinates into a/b/c coordinates can be used for this purpose. The modified transformation can be designed to distribute the effective voltage vector $\tilde{U}_{\alpha\beta}$ that is to be set over the two remaining directions in a/b/c coordinates.

As described previously, it can happen in the presence of a fault state that the sought after desired torque value 54 can only be set within a restricted range. As a result it can happen that on average a reduced torque results in comparison to the desired torque value 54. This can, for example, result from the fact that the operating point of the electric machine 1 is moved on the fault state operating point trajectory 62; 62' between the first branch 72 and the second branch 73, each of which exhibits the desired torque value 54, wherein a segment of the fault state operating point trajectory 62; 62' can exhibit a reduced torque between the first and the second branches 72, 73.

The control apparatus 20 can be designed to shift the operating point of the electric machine 1 on the basis of the determined fault signal 51 and the provided desired torque value 54 in such a way that it exhibits at least partially greater torque values than the desired torque value 54 provided by the provision apparatus 12. In this way it can be ensured that on average the sought after desired torque 54 is provided by the electric machine 1.

The device 10 can furthermore comprise anti-windup structures. Anti-windup algorithms minimize the effects of manipulated variable restrictions in control loop. A classic variant for PID controllers consists, for example, in stopping the integration of a regulation error as soon as manipulated variable restrictions are infringed. Fault states in the power electronics 2 of the electric machine 1, for example a broken down switch, can be interpreted as manipulated variable restrictions, according to which certain voltages can no longer be set at the terminals of the electric machine 1 or of the power electronics 2. These manipulated variable restrictions can either be considered explicitly in a current regulation system, for example as described above, and/or have their effects minimized through a suitable additional anti-windup function. The so-called model-reference anti-windup method can, for example, be used.

Alternatively or in addition, the manipulated variable restrictions defined above can be considered explicitly for the application of certain regulation methods. This can often advantageously be implemented with particular saving of resources. NIMC (Non-Linear Internal Model Control) or Model Predictive Control (MPC) are examples of suitable regulation methods.

FIG. 5 shows a schematic flow diagram for the explanation of a method for controlling an electric machine 1 according to a further form of embodiment of the present invention. The method according to FIG. 5 can particularly be carried out by means of the device 10 according to the invention, and can be adapted according to all the modifications and developments described in relation to the device 10, and vice versa.

In a step S01 a desired torque value 54 is provided for a torque to be exerted by the electric machine 1, such as through the provision apparatus 12 of the device 10. In a step S02 a fault signal 51 is determined that indicates a fault state of the electric machine 1, such as through the monitoring apparatus 14 of the device 10. The fault signal 51 can in particular be provided as described above in reference to the device 10.

In a step S03 a current rotor angle value 56 of the electric machine 1 is determined, for example by means of the determination apparatus 16 of the device 10. In a step S04 a fault state operating point 62; 62' is determined on the basis of the provided desired torque value 54, the determined fault signal 51 and the determined current rotor angle value 56, preferably a complete fault state operating point trajectory 62; 62'. In a step S05 an operating point at which the electric machine 1 is operated is shifted or moved from a normal state operating point 61 to the determined fault state operating point 62; 62', preferably along the determined fault state operating point trajectory 62; 62'.

Although the present invention has been described above with reference to preferred exemplary embodiments, it is not restricted to these, but can be modified in many ways. In particular the invention can be changed or modified in a diverse manner without deviating from the core of the invention.

The fault state operating point 62; 62' and/or the fault state operating point trajectory 62; 62' can, for example, be determined on a first branch 72 of a current ratio function 71 and/or on a second branch 73 of the current ratio function 71 depending on the determined fault signal 61 and the determined current rotor angle value 56, where the previously given definitions of the current ratio function 71 and of the first and the second branch is 72, 73 of the current ratio function 71 can apply.

The fault state operating point can also be determined such that it exhibits a fault state torque value that is different from the desired torque value 54, in particular greater than the desired torque value 54 or greater than or equal to the desired torque value 54. In particular, a fault state operating point trajectory 62, 62' can be determined such that a time average of the torque provided by the electric machine 1 along the fault state operating point trajectory 62; 62' exhibits the desired torque value 54.

The invention claimed is:

1. A device (10) for controlling an electric machine (1), the device comprising:

a provisionor (12) configured to provide a desired torque value (54) for a torque to be exerted by the electric machine (1);

a monitor (14) configured to determine a fault signal (51) that indicates a fault state of the electric machine (1);

a determiner (16) configured to determine a current rotor angle value (56) of the electric machine (1);

a computer (18) configured to determine at least one fault state operating point (62; 62') on the basis of the provided desired torque value (54), the determined fault signal (51) and the determined current rotor angle value (56); and a controller (20) configured to shift an operating point at which the electric machine (1) is operated from a normal state operating point (61) to the determined fault state operating point (62; 62').

2. The device (10) as claimed in claim 1, wherein the normal state operating point (61) is arranged on a first branch (72) of a current ratio function (71) that is separated from a second branch (73) of the current ratio function (71);

wherein the current ratio function (71) represents a ratio of an electric current, iq, in a q-direction of the electric machine (1) to an electric current, id, in a d-direction of the electric machine (1); wherein the q-direction and the d-direction represent coordinate directions that are arranged with a fixed relationship to a rotor of the electric machine (1);

wherein all points of each branch (72, 73) of the current ratio function (71) have the same torque value.

3. The device (10) as claimed in claim 2, wherein the computer (18) is configured to determine the fault state operating point (62; 62') depending on the determined fault signal (51) and the determined current rotor angle value (56) on the first branch of the current ratio function (71).

4. The device (10) as claimed in claim 2, wherein the computer (18; 118) is configured to determine the at least one fault state operating point (62; 62') depending on the determined fault signal (51) and the determined current rotor angle value (56) on the second branch (73) of the current ratio function (71).

5. The device (10) as claimed in claim 2, wherein the controller (20) is configured to adjust a transformation of first coordinate values in the d-direction and the q-direction into second coordinate values in a-b-c coordinates that indicate terminal magnitudes, depending on the determined fault signal (51).

6. The device (10) as claimed in claim 1, wherein the computer (18) is configured to determine the fault state operating point (62; 62') such that it exhibits a fault state torque value that differs from the desired torque value (54).

7. The device (10) as claimed in claim 1, wherein the device (10) comprises the electric machine (1) to be controlled.

8. A method for controlling an electric machine (1) with the steps of:

providing (S01) a desired torque value (54) for a torque to be exerted by the electric machine (1);

determining (S02) a fault signal (51) that indicates a fault state of the electric machine (1);

determining (S03) a current rotor angle value (56) of the electric machine (1);

determining (S04) a fault state operating point (62; 62') on the basis of the provided desired torque value (54), the determined fault signal (51) and the determined current rotor angle value (56); and shifting or moving (S05) an operating point at which the electric machine (1) is operated from a normal state operating point (61) to the determined fault state operating point (62; 62').

9. The method as claimed in claim 8, wherein the normal state operating point (61) is arranged on a first branch (72) of a current ratio function (71) that is separated from a second branch (73) of the current ratio function (71);

wherein the current ratio function represents a ratio of an electric current, iq, in a q-direction of the electric machine (1) to an electric current, id, in a d-direction of the electric machine (1);

wherein the q-direction and the d-direction represent coordinate directions that are arranged with a fixed relationship to a rotor of the electric machine (1); and wherein the fault state operating point (62) is determined on the first branch (72) of the current ratio function (71) and/or on the second branch (73) of the current ratio function (71) depending on the determined fault signal (51) and the determined current rotor angle value (56).

10. The method as claimed in claim 8, wherein the fault state operating point (62; 62') is determined such that the fault state operating point (62) exhibits a fault state torque value that differs from the desired torque value (54).

* * * * *